United States Patent [19]

Harasta et al.

[11] Patent Number: 5,125,994
[45] Date of Patent: Jun. 30, 1992

[54] THERMOFORMING METHOD

[75] Inventors: Louis P. Harasta, Webster; Newton C. Landis, Penfield; Gerald G. Reafler, Rochester, all of N.Y.

[73] Assignee: Eastman Kodak Company, Rochester, N.Y.

[21] Appl. No.: 430,756

[22] Filed: Nov. 1, 1989

[51] Int. Cl.$^5$ .............................. B32B 31/20
[52] U.S. Cl. .................... 156/160; 156/212; 156/285; 156/311; 264/235; 264/346
[58] Field of Search ............... 156/285, 286, 311, 382, 156/160, 163, 212, 99; 264/346, 235

[56] References Cited

U.S. PATENT DOCUMENTS

| | | | |
|---|---|---|---|
| 3,551,232 | 12/1970 | Thompson | 156/87 |
| 4,457,797 | 7/1984 | Hatchadoorian et al. | 156/285 X |
| 4,522,670 | 6/1985 | Caines | 264/346 X |
| 4,569,885 | 2/1986 | Yamaguchi et al. | 264/346 X |
| 4,590,021 | 5/1986 | Ota et al. | 264/346 X |
| 4,769,100 | 9/1988 | Short et al. | 156/285 |
| 4,810,540 | 3/1989 | Ellison et al. | 428/31 |
| 4,824,506 | 4/1989 | Hoerner et al. | 156/245 |
| 4,828,637 | 5/1989 | Mentzer et al. | 156/212 |
| 4,838,973 | 6/1989 | Mentzer et al. | 156/212 |

FOREIGN PATENT DOCUMENTS

8904257  5/1989  PCT Int'l Appl. .
2084513  4/1982  United Kingdom .

Primary Examiner—Michael W. Ball
Assistant Examiner—Michele K. Yoder
Attorney, Agent, or Firm—J. Jeffrey Hawley; William T. French

[57] ABSTRACT

An adhesive-coated thermoplastic film is stretched and bonded to a three-dimensional substrate by vacuum thermoforming at a lower than normal temperature, at which the film has an elastic modulus of at least $10^9$ dynes/cm$^2$, followed by moderate heat treatment of the resulting laminated article. The procedure is especially useful in avoiding air entrapment and peel-back in the thermoforming of a paint-coated film on exterior body panels for automobiles.

5 Claims, 9 Drawing Sheets

THERMOFORMING METHOD

FIELD OF THE INVENTION

This invention relates to a method for thermoforming thermoplastic sheet material and, more particularly, to such a method wherein certain potential defects in the thermoformed product are avoided.

BACKGROUND OF THE INVENTION

As an improvement over the spray painting of articles such as automobile bodies, boats and household appliances, a new kind of paint-coated sheet material (also called paint-coated film) has been developed to provide protective and decorative finishes. The new material comprises a flexible, stretchable, thermoplastic carrier film which has a protective and decorative paint layer of uniform thickness and appearance on one side, and, optionally, an adhesive layer on the other side. It can also have other layers such as a tie or bonding layer between the paint layer and the carrier film. In a preferred embodiment, a transparent topcoat covers the paint layer. This combination provides an attractive basecoat-clearcoat appearance which is especially desirable for automotive finishes.

Using known vacuum thermoforming procedures, the paint-coated film can be stretched and bonded to an article such as an automobile body panel to give a basecoat-clearcoat finish. Advantages over obtaining such finishes by the use of paint-coated film instead of by spray painting include improved control of evaporating solvents, which reduces air pollution, and the elimination or reduction of paint sludge as a hazardous waste product. Furthermore, the new paint-coated film has a remarkably smoother and more attractive appearance than spray painted finishes. This new type of thermoformable sheet material and a process for its manufacture are described in the U.S. patent application of G. G. Reafler, Ser. No. 116,426, filed Nov. 3, 1987. The process involves applying the paint composition to the surface of the thermoplastic carrier film by laminar flow coating, followed by drying and then coating and drying each additional layer in sequence to obtain a paint-coated film of excellent gloss and smoothness.

The paint-coated film can be stretched and bonded by vacuum thermoforming to a three dimensional substrate such as an automobile panel to form a bonded article. However, it has been found that as a result of the thermoforming procedure certain defects may develop in the resulting bonded article, especially if the article is subjected to high temperature over a period of time.

One such defect can result from the entrapment of air bubbles between the film and the substrate. When large enough, the bubbles are immediately visible after thermoforming as irregularities in the otherwise smooth paint-coated surface. Even small bubbles, however, can cause visible defects when the article is exposed to high temperature over a period of time, as occurs when an automobile is exposed to the sun in warm weather.

To avoid air entrapment when adhesively bonding a film to a substrate by vacuum thermoforming, others have thought it necessary to use porous substrates or to form holes in the substrate. In the patent to Thompson, U.S. Pat. No. 3,551,232, solid particles are added to the adhesive composition to facilitate air flow. These expedients, however, can cause visible patterns or defects in the surface of the adhesively bonded, thermoformed film.

Exposure to high temperature can also result in the defect known as "peel-back". This is believed to result from stress relaxation of the bonded film and is a consequence of stress created in the film when stretched by the thermoforming operation and bonded to a rigid substrate. When the bonded article is heated, for example, to 200° F. for one hour, the adhesive bond weakens and, at least along the edges, the stretched film shrinks and peels back. A need exists, therefore, for a thermoforming method which will reduce or eliminate air entrapment and the risk of peel-back of the bonded film. The method should also produce a film surface which is smooth and glossy and free of the undesirable patterns which would be caused by holes or pores in the substrate or by particles in the adhesive composition. The present invention provides such a method by means of which a paint-coated film can be bonded to a non-porous, three-dimensional substrate with little or no air entrapment and with limited risk of peel-back at elevated temperatures.

BRIEF SUMMARY OF THE INVENTION

In the method of the invention, a stretchable thermoplastic film is stretched and bonded to a three-dimensional substrate to form a bonded article. The film is placed close to the substrate in a vacuum chamber with an adhesive layer between the film and substrate and at a low thermoforming temperature is vacuum thermoformed into adhesive bonding contact with the three-dimensional substrate. The low thermoforming temperature is above the Tg of the film but is a temperature at which the modulus of elasticity of the film is at least $10^9$ dynes/cm$^2$. This thermoforming temperature is sufficiently low that, when the film is stretched and bonded by thermoforming to the three-dimensional substrate, the bonded film is under substantial stress. The resulting bonded article is cooled, while maintaining vacuum to restrain the film from shrinking, preferably to room temperature, to increase the adhesive bond strength. Thereafter, the bonded article is heated to a stress relieving temperature but below the temperature at which stress in the film exceeds the adhesive bond strength of the film to the substrate. This heating stage is for a sufficient time to relieve stress in the stretched and bonded film to a level below the adhesive bond strength at 200° F.

THE DRAWINGS

Further understanding of the invention can be gained by reference to the drawings of which.

DETAILED DESCRIPTION

In the method of the invention the vacuum thermoforming operation is carried out at a temperature, which, for any particular thermoformable sheet material, is lower than heretofore had been thought desirable. In the previous thermoforming operations, a relatively higher temperature has been used in order to render the film extremely flexible and stretchable. By heating the sheet material or film to such higher temperatures, it can be stretched and conformed to three-dimensional substrates without splitting the film and without leaving high stresses in the bonded film that lead to delamination or peel-back.

In accordance with the present invention, it has been found, however, that when the thermoforming operation is carried out at a lower temperature for a particularly plastic film than was previously thought desirable, an unexpected advantage is obtained. The tendency toward entrapment of air between the adhesive-coated film and the substrate, which in the past has been a problem in the thermoforming-bonding of an adhesive-coated film to a three-dimensional, rigid, non-porous substrate, is markedly reduced. Although we do not wish to be bound by theoretical explanations, it appears that when the film is somewhat cooler than normal thermoforming temperature, the elastic modulus is higher and the film is drawn down by the vacuum onto the substrate more slowly. This is believed to provide better opportunity for air to escape from between the descending film and the substrate. Also, since the film is drawn down more slowly, the absolute pressure in the vacuum chamber is lower at the time the film contacts the substrate. Hence, less air is present that could become trapped between the film and the substrate.

Although the applicants have found that thermoforming at a lower temperature and, hence, a higher elastic modulus, unexpectedly reduces the entrapment of air, it does create a further problem. When the film is stretched and bonded at the lower temperature and higher modulus, such a high stress is locked into the bonded film that it has a strong tendency to peel-back from the edges of the bonded article when the article is subjected to high temperatures, e.g., 93° C. In the method of the present invention, this problem is overcome or reduced by heating the bonded article (after it has been cooled to set the adhesive) to a relatively mild stress relieving temperature. If this temperature is too high, the adhesive bond strength will weaken and the film will shrink and peel back. On the other hand if the temperature is too low, the relieving of stress will require an impractical long period of time. For many thermoplastic polymer films, e.g., linear polyester films and such films coated with polyurethane paints, a preferred stress relieving temperature is above about 140° F. Hence, for such films the preferred stress relieving temperature is above about 140° F. but below the temperature at which stress in the film exceeds the adhesive bond strength. In addition, the duration of this heating stage should be for a sufficient time to relieve the stress in the stretched and bonded film to a level below the strength of the adhesive bond at 200° F. The latter is approximately the maximum temperature to which the bonded article can be expected to be exposed during its use, for example, as an automobile exterior body panel.

Figures 1, 2:
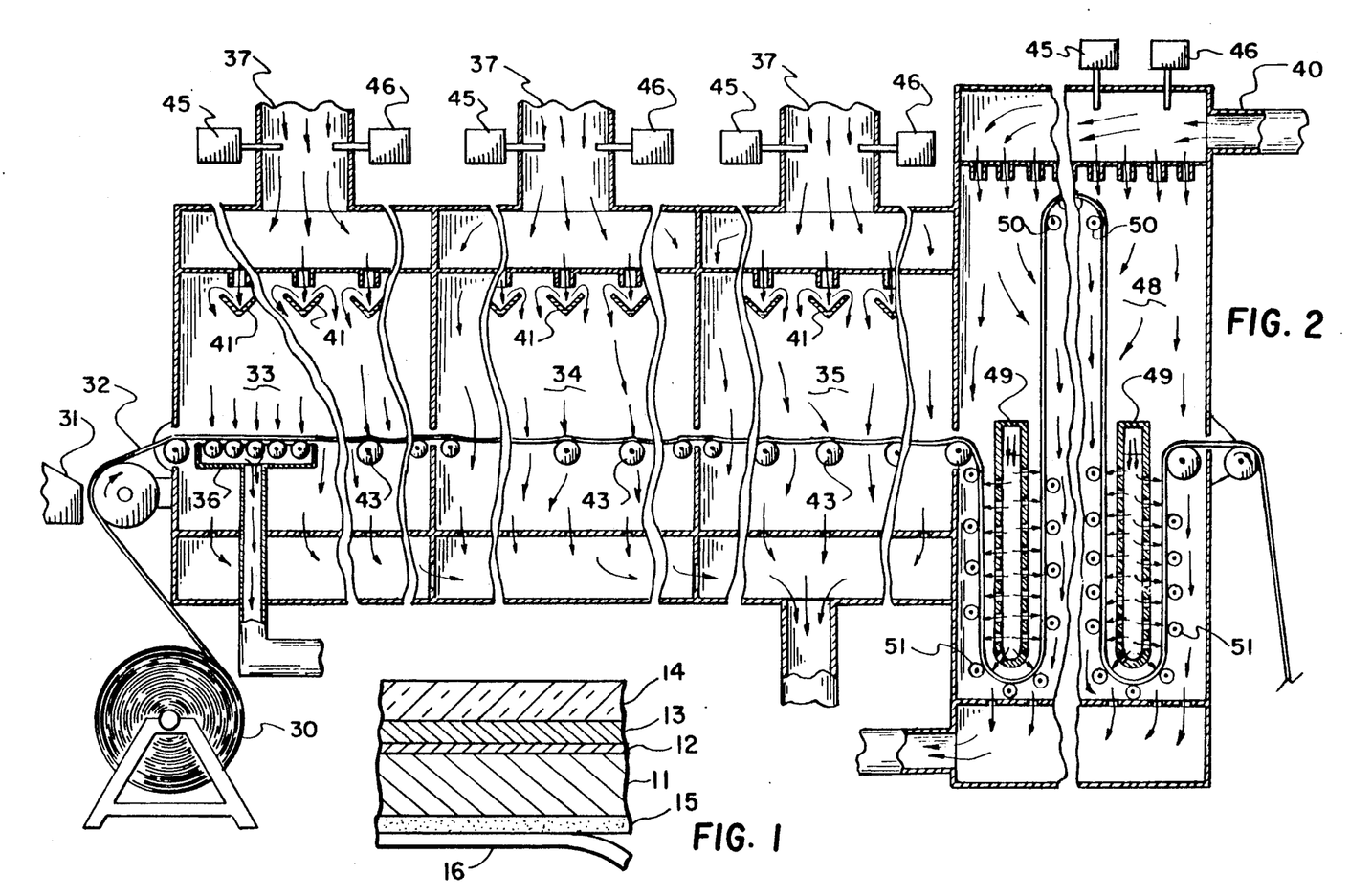
FIG. 1 is a diagrammatic cross-section, highly enlarged and not to scale, of a preferred paint-coated film for use in the method of the invention.
FIG. 2 is a diagrammatic side view of apparatus with which such film can be manufactured.

FIG. 1 is a cross-section of one embodiment of a paint-coated film 10 which can be thermoformed in the method of the invention. Layer 11 is a flexible and stretchable, thermoplastic polymeric carrier film. Coated on the carrier film 11 is a protective and decorative paint layer 13, as used in automotive finishes.

Although not essential with all combinations of carrier films and paint compositions, a thin tie layer 12 can be coated and dried on the carrier film before the paint layer is coated in order to improve the bonding of the paint layer to the carrier film.

Preferably, coated on the upper surface of the paint layer is a flexible, thermoformable, clearcoat layer 14. This layer with the paint layer, provides a desirable basecoat-clearcoat appearance.

Coated on the side of the carrier film opposite to the paint layer, is a pressure-sensitive adhesive layer 15. This provides a means for securely bonding the sheet material to a substrate such as an automobile panel. Following the application of the adhesive layer 15, the sheet material is interwound with a thin release sheet 16 of, e.g., polyester film, to permit tack-free winding of the finished sheet material on a core. An optional silicone release coating can be on the release sheet 16 to aid in stripping it from the adhesive layer prior to thermoforming the sheet material to a substrate.

Although, most commonly and preferably, the film being thermoformed and bonded to a substrate will have an adhesive coating, it is also within the scope of the invention to provide an adhesive layer between the film and substrate in other ways. For example, the adhesive layer can be coated, e.g. by spraying, on the substrate or a separate adhesive film can be placed between the substrate and the film being thermoformed.

Figure 3:
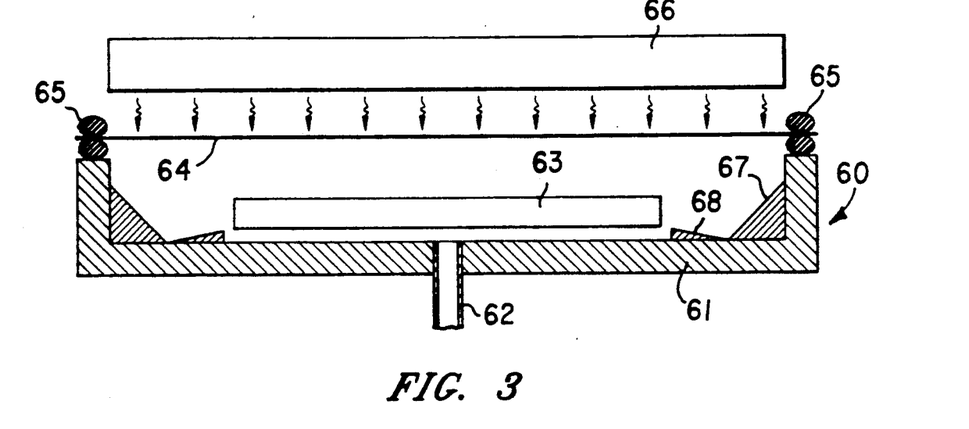
FIG. 3 is a diagrammatic representation of a vacuum thermoforming apparatus in which the method of the invention can be practiced.

The stretching and bonding of a thermoplastic, thermoformable film to a substrate by vacuum thermoforming can be carried out in apparatus such as that which is illustrated diagrammatically and in cross-section in FIG. 3. Apparatus 60 includes a vacuum chamber 61 which is connected by conduit 62 to a vacuum source not shown in the drawing. Mounted within chamber 61, on supports not shown in the cross-sectional view, is a substrate 63, the surface of which is to covered by and bonded to a thermoplastic film. Although various automobile parts and panels are examples of such substrates, the method of the invention can be used to thermoform and bond thermoplastic films to a wide range of other substrates, including parts for boats, household appliances, office equipment and the like. A stretchable thermoplastic film 64, the underside of which is adhesive coated, is clamped in a frame 65 and placed over and in proximity to the substrate. The frame and film form an air-tight seal for the vacuum chamber. Above the film is a heating means 66 which include resistance coils, infrared lamps or other heat source. Chamber 61 is also preferably provided with a contouring structure 67 which fills the corners of the chamber and limits the drawdown distance of the film. This aids in preventing excessive stretching and tearing of the film. Preferably, also the chamber is provided with triangular "web catchers" 68 which aid in preventing the film from "webbing" or bonding to itself as it is drawn down. These preferred structures are described in more detail in the copending application of Reafler et al, Ser. No. 399,647 filed Aug. 28, 1989.

Figure 4:
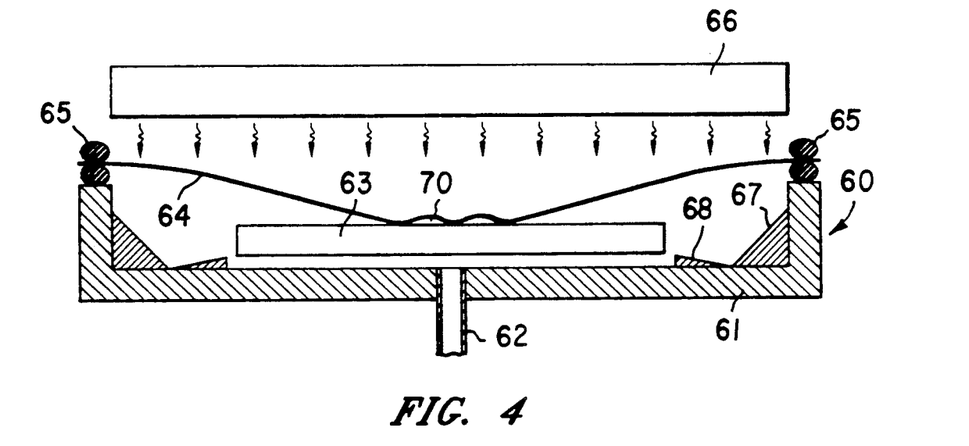
FIGS. 4–5 illustrate the use of the apparatus of FIG. 3 under thermoforming conditions that result in undesirable air entrapment.
Figure 5:
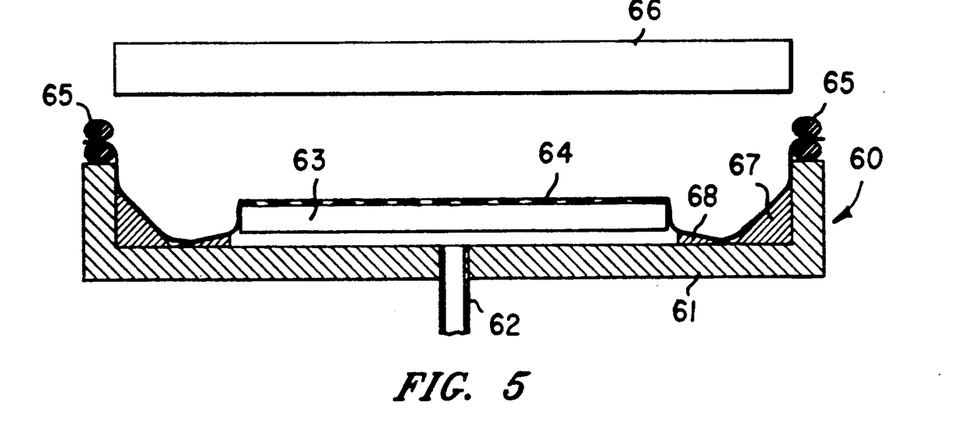

FIGS. 4 and 5 illustrate the use of the apparatus of FIG. 3 under thermoforming conditions that result in undesirable air entrapment. Thus, the heater 66 heats the film 64 to a temperature which is sufficiently high to reduce the elastic modulus of film 64 below about $10^9$ dynes/cm$^2$, the film becomes so flexible that it draws down rapidly and entraps air bubbles 70. Because of the adhesive layer, the film begins to bond rapidly to the substrate 63. The air cannot escape through the nonporous substrate and is trapped between the film and the substrate. FIG. 5 shows bubbles trapped along the entire surface of the substrate. The bubbles are shown in somewhat smaller size than in FIG. 4 since FIG. 5 represents the state of the bonded article after drawdown is completed and the film has cooled.

Figure 6:
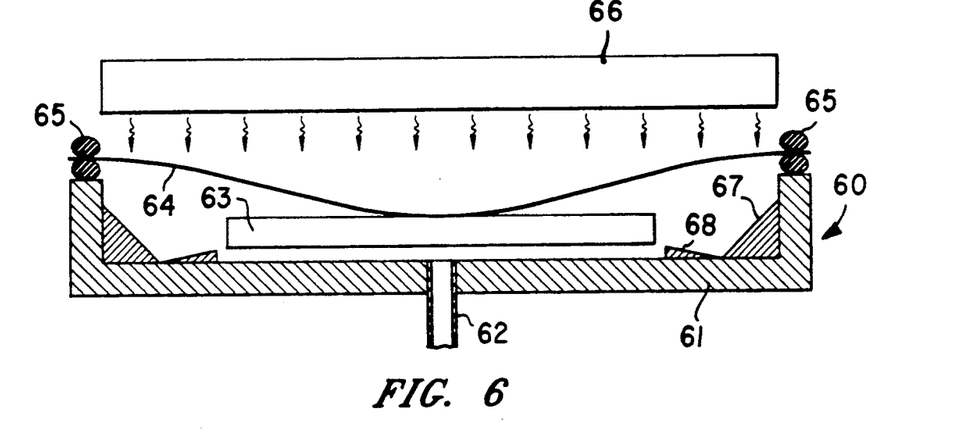
FIGS. 6–7 are diagrammatic representations of different stages in the thermoforming-bonding of an adhesive-coated film to a substrate.
Figure 7:
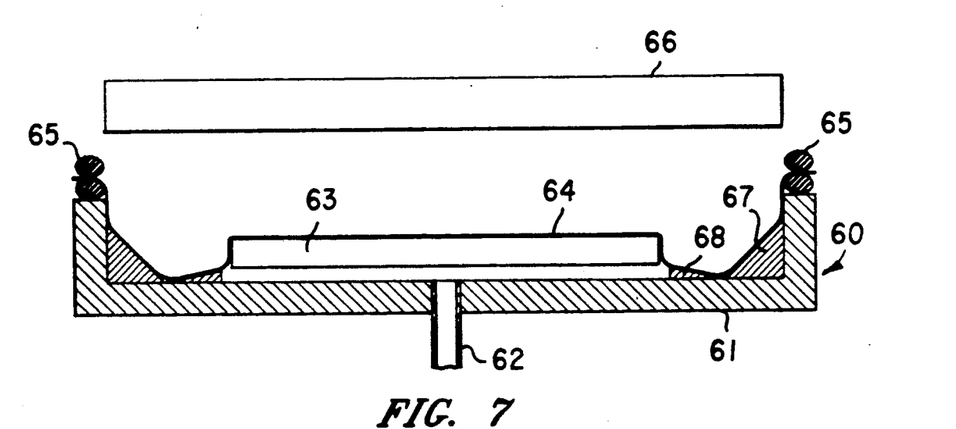
Figure 8:
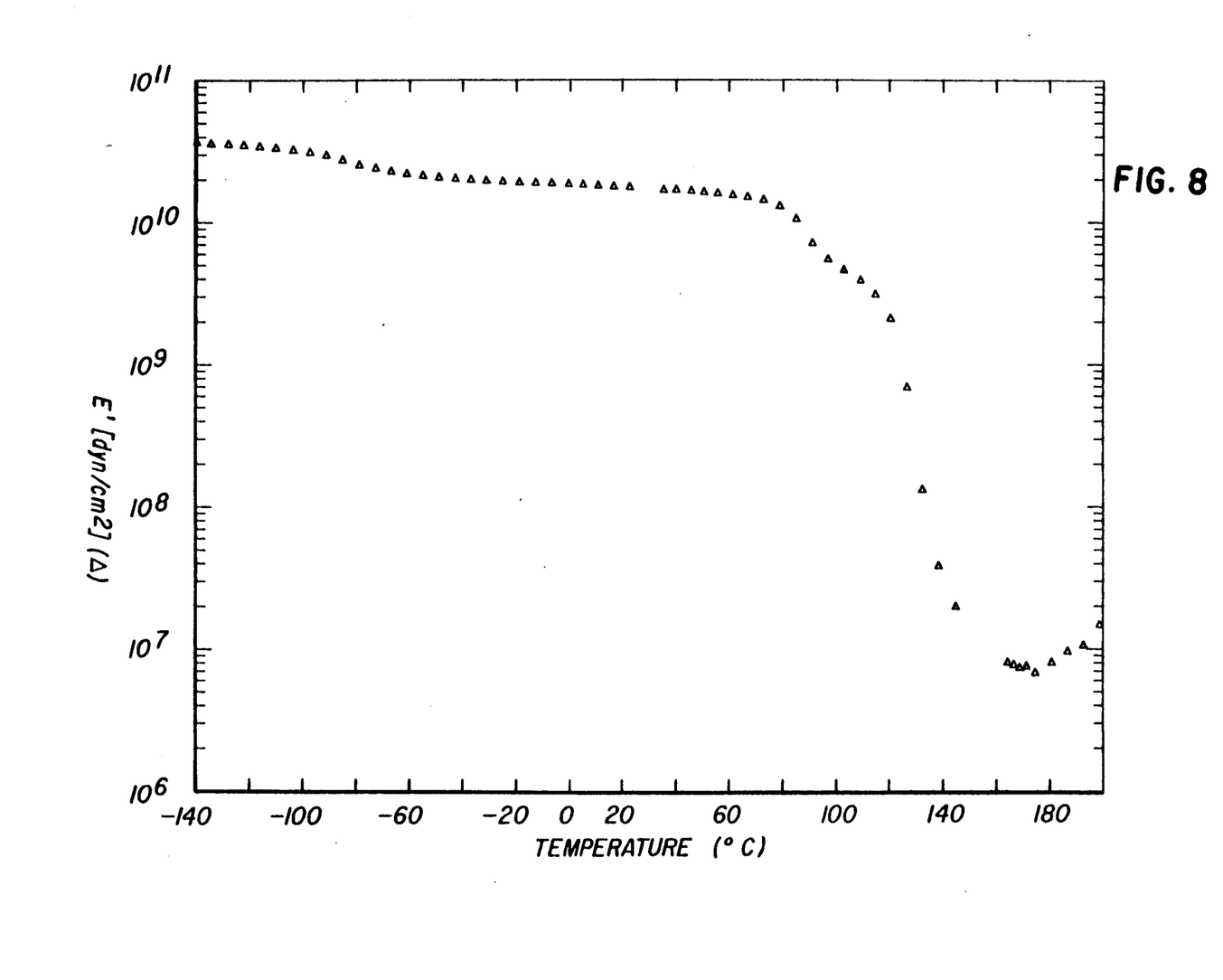
FIGS. 8–13 are plots of elastic modulus versus temperature for a series of thermoplastic films.
Figure 9:
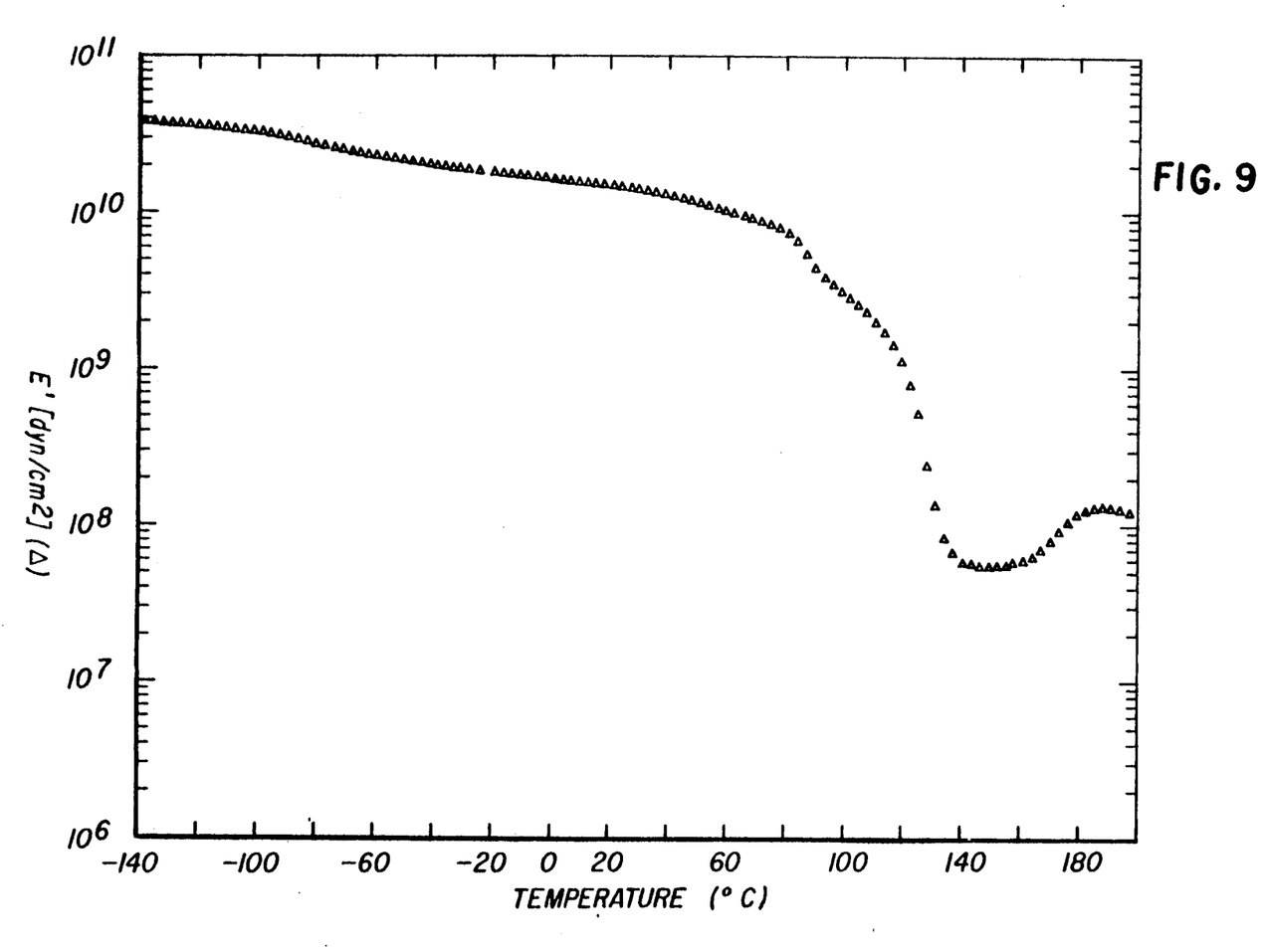
Figure 10:
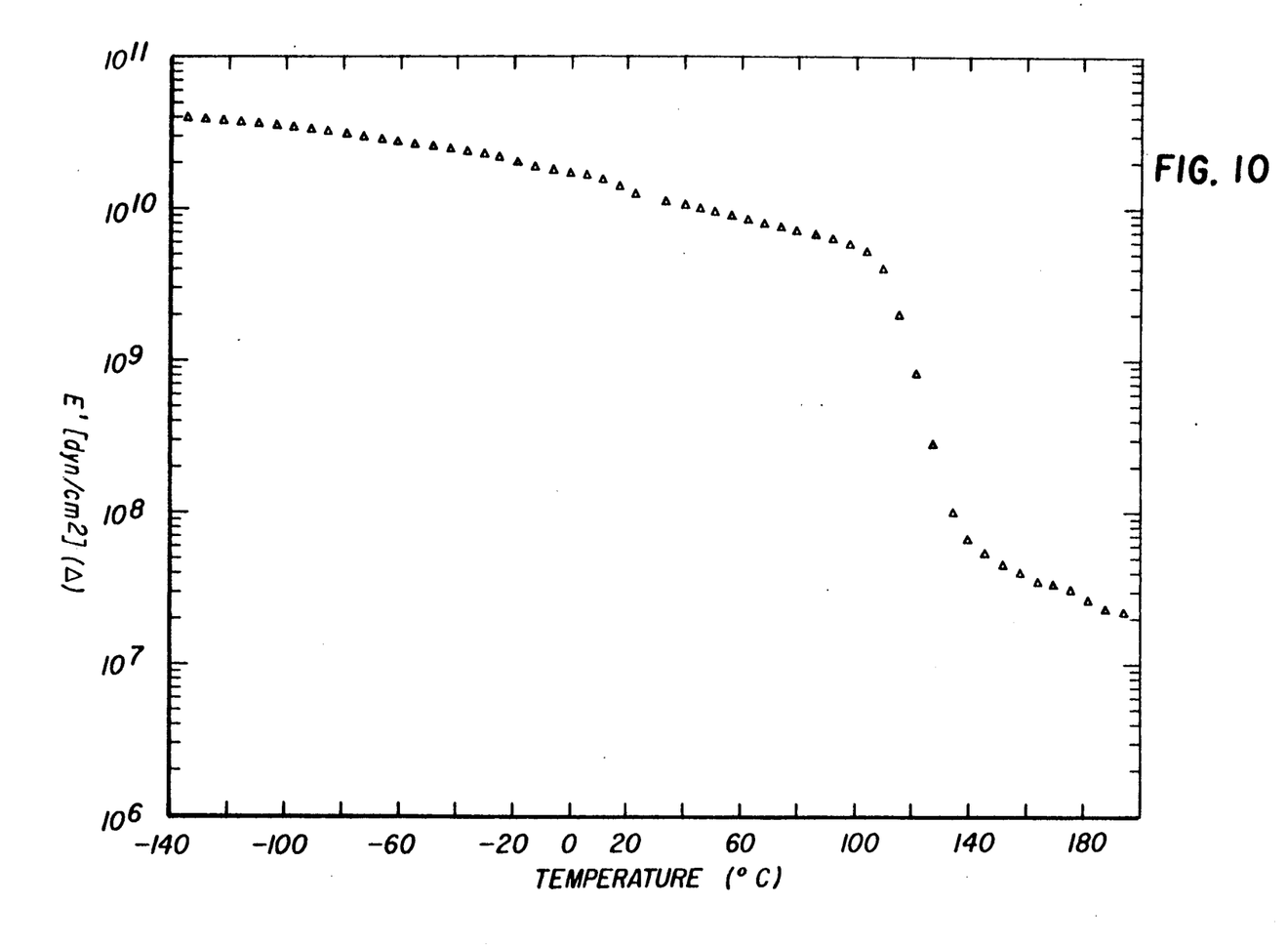
Figure 11:
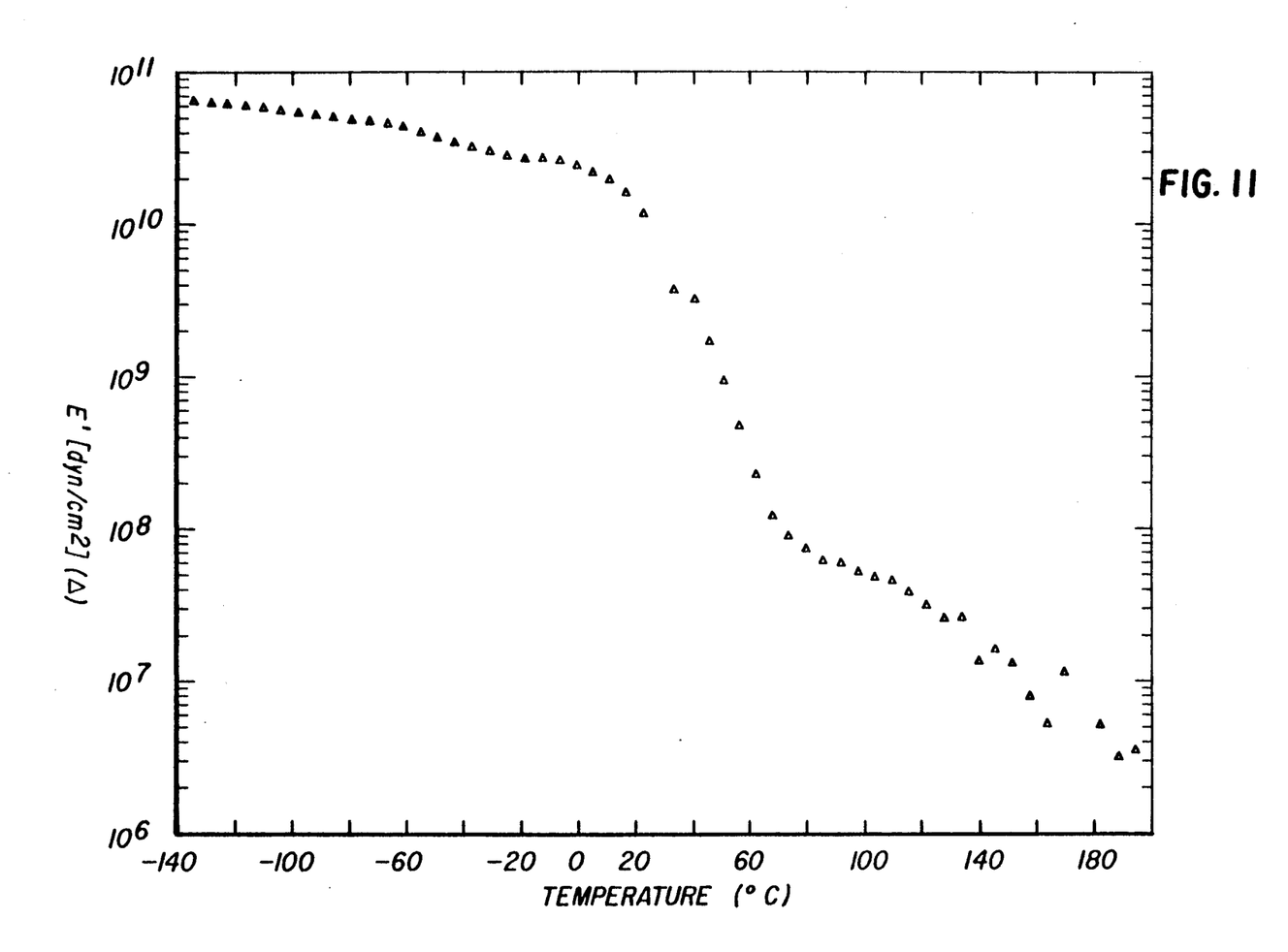
Figure 12:
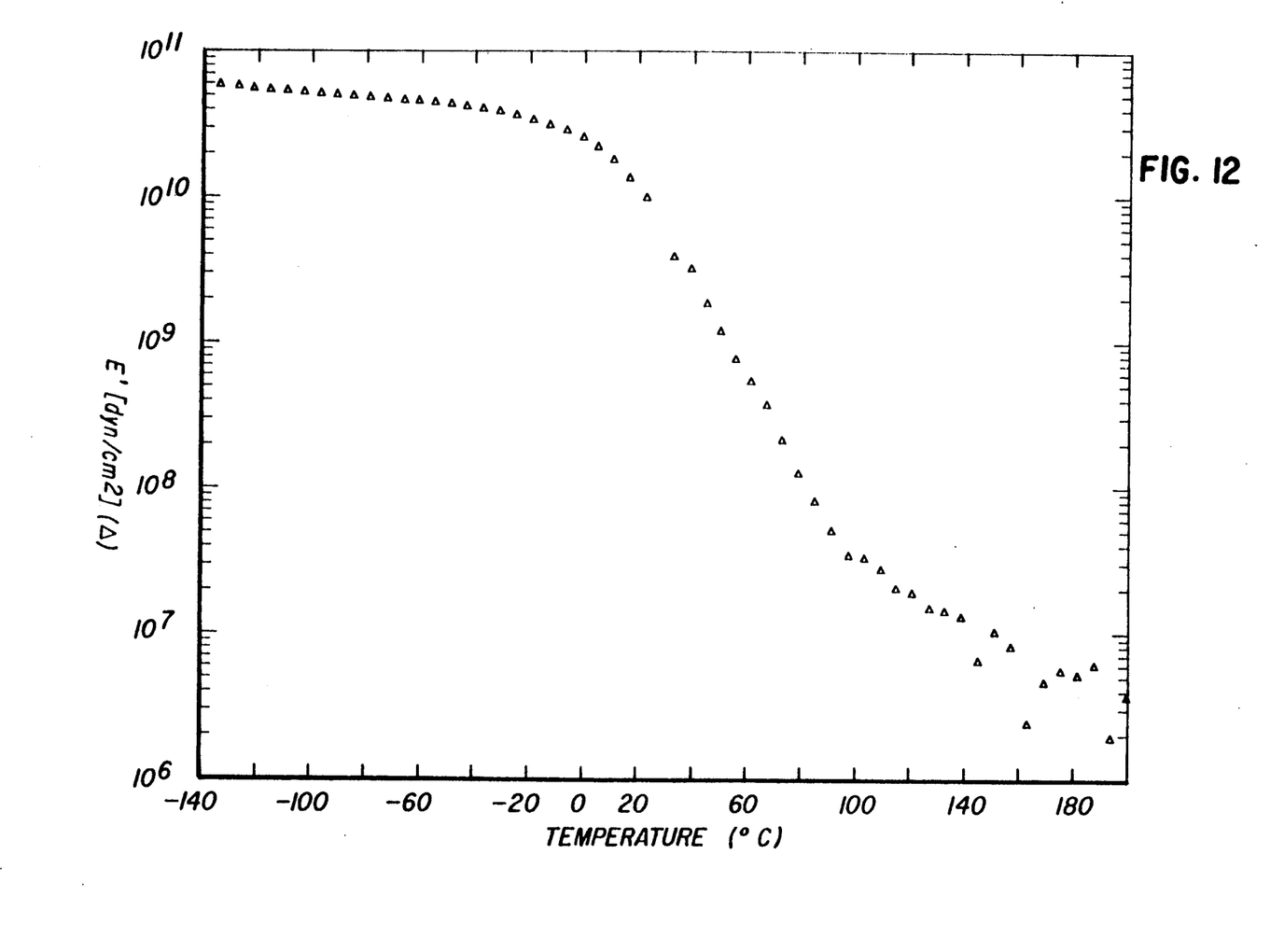
Figure 13:
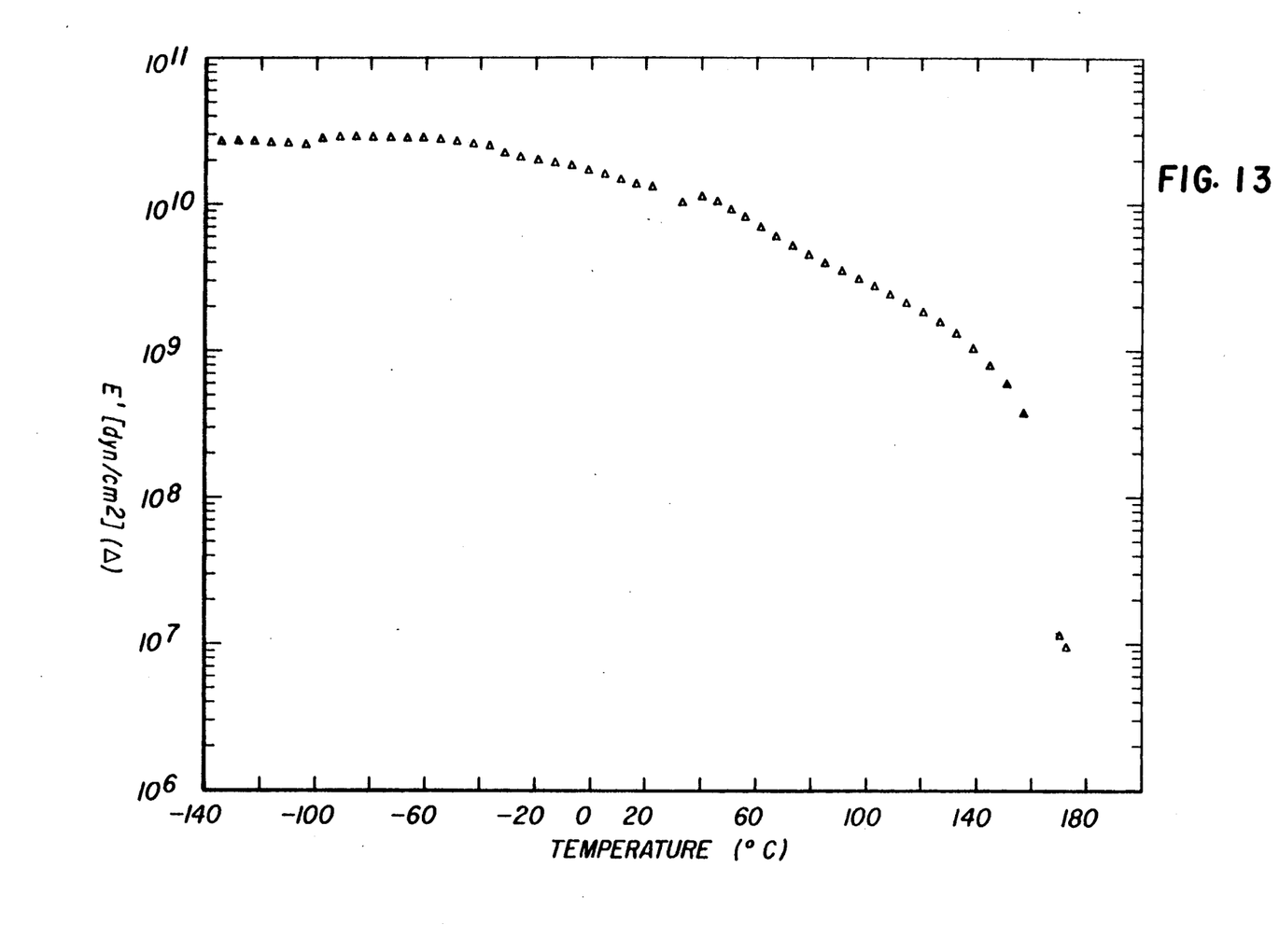

FIGS. 6 and 7 represent stages in the method of the invention. In FIG. 6 the heater 66 heats film 64 to a somewhat lower temperature than in the procedure of FIG. 4. This is a relatively low thermoforming temperature but is above the glass transition temperature (Tg) of the film. It is a temperature which is sufficiently low that the modulus of elasticity of the thermoplastic film will be greater than 10 dyne/cm$^2$. Specific illustrations of such temperature/modulus relations are discussed more fully below, particularly in connection with the graphs of FIGS. 8-13. As illustrated in FIG. 6, the modulus of the thermoplastic film 64 is sufficiently high that the film draws down more slowly than at the higher temperature of FIG. 4. It is also believed that the profile of the higher modulus film is not so flat as at lower modulus. Consequently, little or no air is entrapped as the film descends and is bonded to the substrate.

Although air is not trapped, when the film 64 is fully drawn down and bonded to substrate 63, because of its higher modulus, the film is under substantial stress, a considerably higher stress than when thermoformed at higher temperature as in FIG. 4.

While at this higher stress and while restraining the film from shrinking by maintaining the vacuum in chamber 61, the heater 66 in FIG. 7 is shut off and the bonded or laminated article, consisting of film 64 and substrate 63 is cooled, e.g., to room temperature and is kept in this condition for sufficient time to increase the adhesive bond strength. This requires usually only a few seconds or minutes to increase the bond sufficiently that the stretched film will not immediately peel back from the substrate when the vacuum is released and the excess film is trimmed from the edges of the substrate.

After cooling the bonded article and removing it from the vacuum chamber, it is preferably maintained at room temperature for several hours. It is then subjected to heat treatment for an extended time. The temperature of the heat treatment must be sufficiently high to relieve the locked in stress in the film within a reasonable time but must not be so high that the adhesive bond strength is weakened so much that the film will break loose from the substrate. In other words the stress in the film should not exceed the adhesive bond strength of the film. The duration of this heat treatment is sufficient that the stress in the bonded film is relieved to a level which is below the strength the adhesive bond would have if heated to about 200° F., the latter being approximately the maximum temperature to which a thermoformed exterior automobile panel, for example, can be expected to be exposed.

FIGS. 3-7 show one form of thermoforming apparatus for use in the method of the invention. Another, disclosed in the Reafler et al application Ser. No. 399,647 filed Aug. 28, 1989, is the so-called "double vacuum" apparatus in which vacuum is created on both sides of the film initially to reduce air entrapment. Still another is shown in the patent to Short et al, U.S. Pat. No. 4,769,100.

FIG. 2 illustrates diagrammatically a preferred coating and drying apparatus which can be used to manufacture the sheet material of the invention by the preferred procedures of laminar flow coating and plural stage drying. Coating hopper 31 is an extrusion coating hopper such as the type disclosed by Beguin, U.S. Pat. No. 2,681,294. The coating hopper extrudes in laminar flow through a narrow slot a horizontally extending bead of the coating liquid in contact with the continuously moving, thermoplastic carrier film web 32. The coating composition is thus coated as a uniform layer onto the surface of the web. The first layer coated on the web can be tie-layer 12 or paint layer 13 of FIG. 1. In either case, the carrier film web supplied by roll 30, whether or not previously coated, passes in close proximity to the narrow extrusion slot of the coating hopper 31. As the web passes the hopper, a laminar flow of the fluid coating composition is extruded on the web, the entire thickness of the coating for that particular pass being applied simultaneously across the width of the web. Promptly after being coated, the web having the wet layer on its surface is drawn through the drying apparatus.

The coated web 32 is pulled or drawn by take-up rollers not shown in the drawing through successive stages of the drying apparatus. These include initial drying stages 33, 34, 35 and final curing stage 48. Preferably the stages are at successively higher temperatures, the temperatures of the initial stages of the drying zone being mild. This is especially desirable when drying an aqueous paint which contains water and organic solvents. The final stage or stages, however, can be at high temperatures to remove residual liquids and/or to cure the crosslinkable clearcoat. For example, heated air can be introduced at 27° C., 43° C. and 66° C. via lines 37 at stages 33, 34 and 35, respectively. Baffles 41 divert the air flow away from the top of the film and cause it to flow to lower regions of the drying chamber. Sensing controls 45 and 46 aid in maintaining the appropriate air temperature and humidity by feedback mechanisms not shown in the drawing. The speed of the web is such that the coating is subjected to elevated temperature for a substantial time, e.g., for 3 to 6 minutes, in the final stage 48 where the air is admitted via line 40 at about 80° C.

Preferably, the moving web is also heated from its underside by contact with metal rollers 36 and 43 and other rollers in the several drying stages. These metal rollers of high conductivity are heated by the warm air and they transfer heat to the underside of the web, thus further increasing its temperature. In the final stage 48, the web is heated to its highest temperature as it travels through a vertical path in a floating loop section, being guided by rollers 50 and air reversers of the plenums 49 to keep the coated side of the film out of contact with rollers 51. The dried film leaving stage 48 is wound on a take-up roll not shown in the drawing.

For optimum quality the stepwise increase in drying temperatures and other procedures such as humidity control, of the Fronheiser et al. drying process described in U.S. Patent Application Ser. No. 166,083, are preferred for drying the paint and other layers.

It has been found, as disclosed in copending U.S. patent application Ser. No. 287,417 of Gerald G. Reafler, filed Dec. 20, 1988, that a clearcoat thickness greater than 0.1 mm (4 mils) improves the retention of gloss in stretched areas when a sheet material having a metallic flake basecoat is thermoformed. Hence, in the preferred paint-coated films for use in the method of the present invention, the clearcoat is thick. In such preferred sheet materials the total dry thickness of the clearcoat is at least 0.1 mm and most preferably is at least 0.25 mm.

Since the clearcoat for the preferred sheet material is thick, it is preferred to coat such layers in two or more passes in order to dry them adequately. For example, if the clearcoat dry thickness is to be 0.12 mm, a first pass can coat and dry a layer of 0.06 mm dry thickness and a second pass can coat and dry a second layer to raise the total dry thickness to 0.12 mm.

The carrier film for the sheet material is an essentially planar, self-supporting, stretchable, flexible, thermoplastic polymeric film which can be transparent, translucent or opaque. It has a substantially uniform thickness, preferably, in the range from about 0.05 to 0.50 millimeter (2-20 mils). A preferred thickness is in the range from about 0.16 to 0.32 millimeters (6-13 mils).

The carrier film has heat softening and tensile elongation properties suitable for the thermoforming process. Preferred polymers for the film are those known to be useful in thermoforming and/or vaccuum-forming techniques, such as polyvinyl chloride, polyvinyl acetate, ABS (acrylonitrile-butadiene-styrene) resins, polyethylene and polypropylene. Useful carrier film compositions include the polyacrylate blends with copolyesters described in U.S. Pat. No. 4,246,381, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred carrier film polymers exhibit a tensile elongation at break of at least about 40 percent when measured in accordance with ASTM D-638. A highly preferred carrier film composition is a blend of copolyesters based on poly(1,4-cyclohexanedimethylene terephthalate) and rubber-modified styrene-maleic anhydride copolymers as described in U.S. Pat. No. 4,582,876. A specific example of a polymer blend of this kind which can be extruded as a carrier film consists of a blend of 55:45% by weight of a copolyester and "Dylark 600" styrene copolymer. The latter is a rubber-modified styrene-maleic anhydride copolymer available from ARCO Chemical Company, a division of Atlantic Richfield Company. The copolyester is derived from terephthalic acid, 19 mole % ethylene glycol and 81 mole % 1,4-cyclohexanedimethanol.

Other examples of stretchable carrier films include the highly flexible and stretchable films which are made by the extrusion of blends of a flexible poly(ether-ester) with a more rigid polyester as described in the copending application of Seymour, Ser. No. 151,727, filed Feb. 7, 1988. The carrier film can include fillers, UV absorbers, plasticizers, colorants, antioxidants, etc., known to be useful in polymeric films.

Paint or basecoat layers for the sheet materials have a colorant and/or light reflective flakes incorporated in the film-forming binder. Conventional colorants for paint compositions can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others known to those skilled in the art.

Any light-reflective flakes conventionally employed in paints, particularly those employed in automotive finish paints can be used. Suitable reflective flakes include metallic flakes such as aluminum flake, copper flake, bronze flake, copper bronze flake, nickel flake, zinc flake, magnesium flake, silver flake, gold flake, platinum flake and other platelets such a mica, glass, stainless steel, coated mica, coated glass, and aluminum coated polyester film fragments. Mixtures of two or more types can be used.

The film-forming binder for the basecoat preferably is a polyurethane but other flexible film-forming resins conventionally used as binders in basecoat compositions can be used, such as acrylic polymers and polyesters, including alkyds. Examples of such binders are described in U.S. Pat. Nos. 4,681,811; 4,403,003 and 4,220,679.

Most of the polymers described in the above references are organic solvent-based polymers, although acrylic polymers can be prepared via aqueous emulsion polymerization techniques and used as aqueous-based basecoat compositions. Useful water-based basecoats in color-plus-clear compositions are disclosed in U.S. Pat. No. 4,403,003. Water-based polyurethanes such as those described in U.S. Pat. Nos. 4,719,132 and 4,147,679 are examples of preferred binders for the paint layer.

The dried paint layer preferably has a mean thickness in the range of from about 0.012 and 0.080 millimeters (0.5-3 mils). A particularly preferred mean thickness is in the range of from about 0.020 to 0.060 millimeters (0.8-2.4 mils). The paint layer preferably is applied by forming a laminar flow of the paint composition, and directing the flow into contact with the moving carrier film web to form the paint layer.

The preferred method for coating the layers is laminar flow coating, using an extrusion coating hopper as disclosed, for example, in the patent to Beguin, U.S. Pat. No. 2,681,294. It is also possible to coat multiple layers simultaneously, using a slide coating hopper as in the patent to Mercier et al, U.S. Pat. No. 2,761,419 or the patent to Padday, U.S. Pat. No. 3,005,440 or, preferably, using an extrusion-slide hopper of the type disclosed in the patent to Russell et al, U.S. Pat. No. 2,761,417 or the patent to Jackson et al, U.S. Pat. No. 3,996,885. Also useful are multiple layer extrusion hoppers as in the patent to Russell, U.S. Pat. No. 2,761,418 and the patent to Mercier, U.S. Pat. No. 3,627,564, and other laminar flow coating methods described in Reafler patent application, Ser. No. 116,426 cited above.

While laminar flow coating is greatly preferred, since it produces layers of the best uniformity, smoothness and gloss, it is also possible for the thermoforming method of the invention to use paint-coated films made by other coating methods. Other such methods include spray coating as disclosed, for example, in Research Disclosure 24,403 of July 1984; the patent to Short et al. U.S. Pat. No. 4,769,100 and European Patent Application 266 109 published May 4, 1988 (U.S. Pat. No. 4,810,540 of Rexham Corporation); bar coating as disclosed in European Patent Application 230 364 published Jul. 29, 1987 (Minnesota Mining and Manufacturing Company); and reverse roll coating as disclosed in European Patent Application 285 071 published Oct. 5, 1988 (Avery International Corporation).

The paint layer can be coated on a carrier film having an adhesion promoting tie-layer. Tie-layers can be formed from compositions comprising an adhesion promoting species and optionally a solvent. Useful adhesion promoting species include polymers derived from acrylonitrile, vinylidene chloride, and acrylic acid; polymers derived from methylacrylate, vinylidene chloride and itaconic acid; cellulose nitrate, and a variety of commercially available adhesion promoting species, for example, those known under the trade designations FORMVAR 7/95, FORMVAR 15/95, BUTVAR B-98 and BUTVAR B-72, sold by Monsanto, MOBAY N-50 sold by Mobay, VINAC B-15 sold by Air Products, ELVACITE sold by DuPont, and LEXAN sold by General Electric. Suitable solvents include methylethyl ketone, methylene chloride, tetrahydrofuran, toluene, methyl cellosolve, methanol, ethanol, propanol, butanol, mixtures thereof and the like. The tie-layer preferably has a thickness not greater than about 0.0025 millimeter and preferably is much thinner than the decorative and protective layer.

Compositions for the clearcoat layer include crosslinkable clearcoat compositions employed in automotive surface finishing. They are transparent and comprise (a) as one component, a crosslinkable polymeric polyol such as a polyester polyol, a polyurethane polyol, or an acrylic polyol and (b) as a second component, a polyisocyanate curing or crosslinking agent. These components are dissolved in a volatile organic solvent such as acetone or toluene. The resulting reactive solutions are then mixed and the mixture is promptly coated over the previous layer on the carrier film, preferably as disclosed in the patent to Hayward et al, U.S. Pat. No. 4,832,991. The coating is dried and cured by heating to form a crosslinked polyurethane clearcoat.

An example of such a composition is the solvent-based system comprising a polyurethane polyol as one component and an aliphatic polyisocyanate as the other, as disclosed in the patent to Porter, U.S. Pat. No. 4,719,132. Especially preferred is a two-component composition disclosed in this patent, of which one component comprises a crosslinkable poly (esterurethane) polyol and the other comprises an aliphatic polyisocyanate crosslinking agent such as a polyfunctional isocyanurate of 1,6-hexamethylene diisocyanate.

Other useful clearcoat compositions include those described in the patents to Ambrose et al, U.S. Pat. No. 4,699,814; Simpson et al, U.S. Pat. No. 4,650,718; Singer et al, U.S. Pat. No. 4,681,811; Singer et al, U.S. Pat. No. 4,703,101; and Backhouse, U.S. Pat. No. 4,220,679 and U.S. Pat. No. 4,403,003. All of these and the other patents cited herein are incorporated by reference.

Although the method of the invention is especially useful in the thermoforming/bonding of paint-coated films as described, the method is not limited to such films. It can be employed with advantage to thermoform and bond any stretchable, thermoplastic film to a substrate. This can include uncoated clear films or uncoated pigmented films. Examples of suitable uncoated films include those described herein as carrier films for paint layers.

The pressure-sensitive adhesive layer 15 of FIG. 1 can provide a tenacious bond between the substrate and the thermoformable sheet material. Preferred adhesives of this type are acrylic adhesives. Examples include acrylic copolymers of a higher alkyl acrylate such as 2-ethylhexyl acrylate copolymerized with a polar comonomer such as acrylic acid, acrylamide or maleic anhydride. The adhesive is coated from a solution with water or an organic solvent which also can contain additives such as a tackifier resin. Further examples of useful acrylic pressure-sensitive adhesives are described in the patent to Traynor et al, U.S. Pat. No. 4,726,982 of Feb. 23, 1988.

The adhesive layer preferably is applied to the carrier film by laminar flow coating as described in U.S. patent application Ser. No. 116,426 at a dry thickness of about 0.04 to 0.12 (1.5–5 mils) millimeters.

In the preferred sheet material for use in the method of the invention the carrier film, the paint layer, the clearcoat and the bonded transparent topcoat have heat softening and tensile elongation properties which render the sheet material suitable in the thermoforming process. These properties of the different layers are mutually compatible so as to permit substantial elongation by the stretching forces of thermoforming without crazing or delamination. The carrier film, paint layer, clearcoat and topcoat are of sufficiently uniform character that the sheet material exhibits substantially the same uniformity of appearance before and after the thermoforming process.

The preferred paint-coated film for use in the method of the invention, i.e., sheet material described in Reafler Ser. No. 116,426, has a 20 degree gloss, as measured by ASTM Test D-2427, of at least 80. Preferred embodiments have a 20 degree gloss of at least 85 and, most preferably, at least 90. An outstanding advantage of the new method is that when such sheet materials are heated and stretched during thermoforming from the unstressed relaxed state to an extended state having an extended area at least 50% greater than the relaxed area, the sheet material loses little or no gloss. Also the DOI and, for materials having metallic-flake-containing paint layers, the flop, remain high in the extended areas. Tests have shown that, even when stretched more than 100%, the 20 degree gloss in preferred materials remains above 80, and even above 90 for non-metallic basecoats, in the extended or stretched area.

The invention is further illustrated by the following examples which provide a comparison between the method of the invention and other thermoforming procedures.

MATERIAL PREPARATION EXAMPLE 1

A carrier film was prepared from a blend described in U.S. Pat. No. 4,582,876 as follows:

A mixture of 55:45% by weight of copolyester resin and Dylark$^R$ Styrene Copolymer 600 was compounded by extrusion. The copolyester was derived from terephthalic acid, 19 mole % ethylene glycol and 81 mole % 1,4-cyclohexanedimethanol. Dylark$^R$ Styrene Copolymer 600 is a rubber modified styrene-maleic anhydride copolymer available from ARCO Chemical Company, a division of Atlantic Richfield Company.

The blend was heated to 260°–290° C. and extruded through a die into a nip comprising two temperature-controlled chrome plated stainless steel rollers. The extruded web was then cooled on a chilled roller. The thermoplastic film has a mean thickness of about 0.20 mm (7.5 mils) and a maximum thickness deviation of less than 0.02 mm.

The carrier film prepared as described was coated with a thin layer of an aqueous tie coat composition as described in Table I. After drying, the thickness of the tie layer was approximately 0.0005 mm (0.02 mils).

TABLE I

Tie Coat Composition

| Ingredients | Approx. % Wt. |
| --- | --- |
| Ethylene Glycol Monohexyl Ether | <1 |
| Deionized Water | 75 |
| N, N-Dimethyl Ethanolamine | <1 |
| N-Methylpyrrolidone | 1 |
| Diethylene Glycol Monobutyl Ether | 1 |
| Acrylic Resin* | 10 |
| Urethane Resin** | 10 |
| FC170 Surfactant, sold by #M Co. diluted with water to a total solids content of 3.0% by weight. | 0.05 |

*Styrene-butyl acrylate-butyl methacrylate terpolymer
**Reaction product of methylene dicyclohexyl diisocyanate and an aliphatic diol The white paint composition of Table II below was metered from a nitrogen gas pressurized vessel through a coating hopper extrusion slot having a width of 0.25 millimeter onto the carrier film moving at a speed of 8 m/min. The coating method and apparatus were substantially as described in U.S. Pat. No. 2,681,294 and included means for maintaining a pressure differential across opposite surfaces of the coating ribbon. The coating was dried at 40°-90° C. to a thickness of 0.04 mm (1.5 mil) in a plural-stage, continuous flat bed drying apparatus supplied with low velocity, warm air streams as described in the copending patent application of Fronheiser et al, Ser. No. 166,083 filed Mar. 9, 1988.

TABLE II

White Paint Composition

| Ingredients | Approx. % Wt. |
| --- | --- |
| Urethane resin | 15-20 |
| Ethylene Glycol Monohexyl Ether | 2-5 |
| N-Methylpyrrolidone | 2-5 |
| Diethylene Glycol Monobutyl Ether | 2-5 |
| N,N-Dimethyl Ethanolamine | 1-2 |
| Titanium Dioxide | 20-25 |
| Melamine Formaldehyde | 1-2 |
| Toluene | 1-2 |
| N-butyl Alcohol | <1 |
| Deionized water | Balance |

The resulting white paint layer of the paint-coated film was thereafter coated with the following two-component clearcoat composition.

TABLE III

Clearcoat Composition

| Ingredient | | Approx. % Weight |
| --- | --- | --- |
| A* | Polyol: | |
| | Urethane Polyol Resin | 65 |
| | Toluene | 35 |
| | Benzotriazole Absorber | 1 |
| B** | Polyisocyanate: | |
| | Polyfunctional aliphatic isocyanurate resin based on 1,6-hexamethylene diisocyanate | 100 |

*Available as TKUS1002 from PPG Industries, Inc. The urethane polyol resin is a derivative of neopentyl glycol, isophorone diisocyanate and 1,4-cyclohexane-dimethanol and has a number average molecular weight of about 2000 and a weight average molecular weight of about 6000.
**Available as Desmodur N-3300 from Mobay Corporation Coatings Division Component A diluted to 58% solids with toluene and Component B diluted to 85% solids with acetone were mixed and then immediately coated onto the paint layer and dried to form a clear layer having a thickness of 0.06 millimeters.

COMPARATIVE EXAMPLE 1

Thermoforming at "Normal Temperature"

A sample of the white paint-coated films, prepared as described in the above "Material Preparation Example", was stretched and bonded to a metal test panel by vacuum thermoforming at an elevated temperature. In this test, the release sheet was stripped from the adhesive layer of film sample and the periphery of the film was clamped in a frame in a horizontal plane with the adhesive layer facing downwardly. The film was heated to thermoforming temperature of 275° F. by exposure to infra-red heating lamps and was placed in sealing contact over a vacuum chamber containing a metal test panel. The panel was a flat 7.5×30 cm plate which was inclined or tilted on its long axis with respect to the horizontal film. Vacuum drawdown of the heated film was initiated and, as it was drawn down onto the inclined test panel, the film stretched to a degree that was proportional to the distance along the panel. Thus, the film bonded to the area at the top of the panel, which was closest to the original plane of the film, with little or no stretching. The stretching increased along the length of the panel until, at the bottom, it stretched approximately 100 percent in area. When the drawdown was completed, and while maintaining the vacuum to hold the film in place and restrain it from shrinking, the film was cooled to room temperature to set the adhesive or increase its bonding strength. Thereafter, the vacuum was released and the film and bonded panel were removed from the clamping frame. Excess film was trimmed from the edges of the panel and the resulting bonded article, i.e., the rectangular panel with the paint-coated film adhesively bonded to it, was kept at room temperature for several days to maximize the adhesive bonding.

The panel was examined for air entrapment between the film and the metal surface and, although the film surface was smooth and regular, pressing on the film revealed that a substantial quantity of air was trapped between the film and the metal.

Thereafter, the bonded panel was subjected to a peel-back test. In this test, in the area of the panel where the paint-coated film was stretched approximately 100 percent, a scalpel was used to make a straight line cut 1.5 inches in length across and completely through the paint-coated film to the metal surface. Subsequently, the panel was heated to 200° F. for one hour to simulate the maximum exposure of an automobile panel to the sun on a hot day. Results of this test are discussed below in connection with Table I.

COMPARATIVE EXAMPLE 2

Thermoforming at Lower Temperature Without Subsequent Heat Treatment

Another sample of the white paint-coated film prepared as in the Materials Preparation Example was stretched and bonded to a metal panel as in Comparative Example 1, except that the thermoforming temperature was lower. More specifically, the temperature was about 250° F. The resulting bonded article was found to have little or no trapped air between the film and the panel. The film layer of the bonded article was then cut in the area of the panel where the film had stretched 100% during thermoforming. The bonded article was heated to 200° F. for one hour as in Comparative Example 2, to test for peel-back. The results are recorded in Table I.

INVENTION EXAMPLE

Thermoforming at Low Temperature Plus Subsequent Heat Treatment

Another sample of the white paint-coated film of the Material Preparation Example was thermoformed and bonded to a metal panel at the lower thermoforming temperature of 250° F. The resulting bonded article was cooled to room temperature while maintaining the vacuum so as to restrain shrinkage of the film while the adhesive strength increased. It was then removed from the vacuum chamber, the waste film was trimmed from its edges and the bonded article was heated in an oven at 145° F. for 24 hours. Visual inspection showed that little or no air was trapped between the film and the metal surface. The film surface was then cut in the area of the panel where the film had stretched 100 percent during thermoforming. The bonded article was then heated in an oven at 200° F. for one hour. Peel-back results are listed in Table I.

Table I below records the peel-back results for the samples prepared in the Comparative Examples and the Invention Examples. Peel-back is measured after one hour at 200° F. and is the distance in mils between the edges of the paint-coated film at the scalpel cut. Because of the thickness of the scalpel blade, 15 mils of separation is considered to be no peel-back.

ness. The layers were of compositions substantially as described in the Material Preparation Example.

MM EXAMPLE 3

A paint-coated film as in MM Example 2, except that the carrier film was formed of a blend of the DA001 polymer composition with a thermoplastic polycarbonate, the weight ratio being 70/30.

MM EXAMPLE 4

A thermoplastic, polyvinyl chloride film containing blue pigment ("controltac" film of 3M Company).

MM EXAMPLE 5

A clear, thermoplastic polyvinyl chloride film ("DINOC" film of 3M Company) having a printed pattern on one side and over that a thin, clear crosslinked polyurethane layer and on its backside a pressure sensitive adhesive layer.

MM EXAMPLE 6

A clear, uncoated thermoplastic amorphous polypropylene film of 7.5 mils thickness.

The results of the modulus measurements at temperatures ranging from about 140° C. to as high as about 250° C. are plotted in FIGS. 8–13. They show the temperatures at which the indicated films have an elastic modulus greater than about $10^9$ dynes/cm$^2$. The value of plots such as FIGS. 8–13, which can be prepared by

| Example | Elastic Thermoforming Temperature | Modulus, Dynes/cm$^2$ | Subsequent Heat Aging | Excessive Air Entrap. | Peel-Back Test At % Stretch | Peel-back Mils |
|---|---|---|---|---|---|---|
| Comp. 1 | 275° F. | <$10^9$ | None | Yes | 10 | 55 |
| | | | | | 25 | 70 |
| | | | | | 50 | 85 |
| | | | | | 100 | 120 |
| Comp. 2 | 250° F. | >$10^9$ | None | No | 10 | 55 |
| | | | | | 25 | 70 |
| | | | | | 50 | 105 |
| | | | | | 100 | 170 |
| Invention | 250° F. | >$10^9$ | 145° F./ 24 Hrs. | No | 100 | 50 |

MODULUS MEASUREMENT EXAMPLES 1–6

A series of six thermoformable plastic films have been subjected to measurements of elastic modulus at varying temperatures. The elastic modulus measurements were made by Procedure 11.3 of ASTM D4065-82 using a dynamic mechanical analyzer in the tension mode and calculating for elastic modulus, $E^1$. The heating rate in the tests was 20° C./min. and the frequency was 1 Hz. indentifications of these six films are as follows.

MM EXAMPLE 1

An uncoated polyester blend carrier film (identified as DA001) having the composition described in the Material Preparation Example, above. The film thickness was 7.5 mils.

MM EXAMPLE 2

A paint coated film consisting of the DA001 carrier film and having on one side a white polyurethane basecoat of 1.5 mils thickness, a crosslinked polyurethane clearcoat of 1.25 mils thickness and, on its backside, a pressure-sensitive acrylic adhesive layer of 3 mils thick-using the cited ASTM procedure for any chosen thermoplastic film, is that they enable a person skilled in the art to select a relatively low thermoforming temperature (above Tg) at which the film has an elastic modulus greater than about $10^9$ dynes/cm$^2$.

The invention has been described in detail with particular reference to preferred embodiments thereof, but it will be understood that variations and modifications can be effected within the spirit and scope of the invention.

We claims:

1. A method of stretching and bonding a stretchable thermoplastic film to a three-dimensional substrate to form a laminated article which comprises:
   placing the film in proximity to the substrate in a vacuum chamber with an adhesive layer between the film and substrate;
   maintaining the film at a low thermoforming temperature while vacuum thermoforming the film into adhesive bonding contact with the three-dimensional substrate;
   said low thermoforming temperature being above the Tg of the film but being a temperature at which the modulus of elasticity of the film is greater than $10^9$ dynes/cm$^2$ and said low thermoforming temperature being sufficiently low that, when the film is stretched and bonded by thermoforming to the three-dimensional substrate, the bonded film is under substantial stress;

cooling the resulting laminated article, while restraining it from shrinking, to a temperature and for a time to increase the adhesive bond strength, thereafter, again heating the laminated article to a stress relieving temperature but below the temperature at which stress in the film exceeds the adhesive bond strength of the film to the substrate for a sufficient time to relieve stress in the stretched and bonded film to a level below the adhesive bond strength at 200° F.

2. The method according to claim 1 wherein the film comprises a polyester carrier film and on one surface a polyurethane paint layer.

3. The method according to claim 2 wherein the film on its other surface has a pressure-sensitive adhesive layer.

4. The method of claim 3 wherein the thermoforming temperature is below about 250° F.

5. The method according to claim 4 wherein, after cooling the film, reheating it to a temperature between about 140° and 160° F. for at least about one hour.

* * * * *